United States Patent [19]

Suzuki et al.

[11] 4,219,267
[45] Aug. 26, 1980

[54] SAFETY DEVICE FOR EXPOSURE FACTOR SETTING DIAL

[75] Inventors: Masayuki Suzuki, Tokyo; Masayoshi Yamamichi, Kawasaki; Hiroyasu Murakami, Tokyo; Tadashi Ito, Yokohama, all of Japan

[73] Assignee: Canon Kabushiki Kaisha, Tokyo, Japan

[21] Appl. No.: 962,885

[22] Filed: Nov. 22, 1978

[30] Foreign Application Priority Data

Jan. 13, 1978 [JP] Japan .................................... 53-3136

[51] Int. Cl.² ............................................ G03B 17/00
[52] U.S. Cl. ................................................. 354/289
[58] Field of Search ..................... 354/289, 202, 60 L, 354/60 R, 288

[56] References Cited

U.S. PATENT DOCUMENTS

| | | | |
|---|---|---|---|
| 4,005,460 | 1/1977 | Mizukawa | 354/202 |
| 4,072,960 | 2/1978 | Meixner | 354/60 L |
| 4,118,716 | 10/1978 | Suzuki et al. | 354/289 X |
| 4,131,351 | 12/1978 | Iwata et al. | 354/60 L X |

Primary Examiner—Joseph W. Hartary
Assistant Examiner—William B. Perkey
Attorney, Agent, or Firm—Toren, McGeady and Stanger

[57] ABSTRACT

In a camera having an exposure factor setting dial positioned adjacent a film winding lever, there is provided a safety device including a movable cover arranged to protrude upwardly from the inside of the camera housing over a top panel thereof to prevent the operator from inadvertently manually altering the setting of the dial, whereby improper actuation of the dial is prevented and the camera is made substantially fool-proof. When the cover is retracted into the camera housing by engagement of a knurled key portion thereof, the operator may actuate the dial to revise the exposure setting.

5 Claims, 2 Drawing Figures

SAFETY DEVICE FOR EXPOSURE FACTOR SETTING DIAL

BACKGROUND OF THE INVENTION

This invention relates to photographic cameras and more particularly to a safety device for preventing inadvertent actuation of an exposure factor setting member.

In designing photographic cameras to facilitate ease of operation and handling thereof, it has been the practice to determine the location of exposure factor setting members, such as a shutter dial, by a trial-and-error approach. Such members are usually placed on the top panel of the camera housing either to the left-hand corner thereof or at a point adjacent a film winding lever. Recently developed cameras with broadened capabilities require a larger number of control members in the form of dials and levers on the top panel of the camera housing, thereby requiring that the aforementioned exposure factor setting dial be positioned not only on the same side as the film winding lever, but also adjacent thereto.

Such an arrangement of the exposure factor setting dial, however, gives rise to a problem in that, during film winding and shutter cocking operation, the operator often places his first, second, or third finger on the dial without being conscious of the fact that the dial may be inadvertently manipulated. Thus, the dial may be turned to a setting which will deviate from the desired setting used in the preceeding exposure, despite the fact that the operator wishes to make the next exposure with the same desired exposure value.

It is, therefore, an object of the present invention to provide a camera which is substantially fool-proof with regard to the aforementioned inadvertent operation.

Another object of the invention is to provide a safety device for preventing inadvertent actuation of an exposure factor setting member of the camera.

SUMMARY OF THE INVENTION

In one embodiment of the invention adapted for use in a camera having an exposure factor setting dial positioned adjacent the film winding lever, the safety device includes a movable cover which is self-restrained from being inadvertently moved to a position where the dial is accessible to the operator. The cover may be manually moved to a position covering the dial to prevent inadvertent actuation thereof and it may be manually moved to a retracted position when it is desired to change the exposure setting value.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there is illustrated and described a preferred embodiment of the invention.

DETAILED DESCRIPTION OF THE PREFERRED EMBODIMENT

Figure 1:
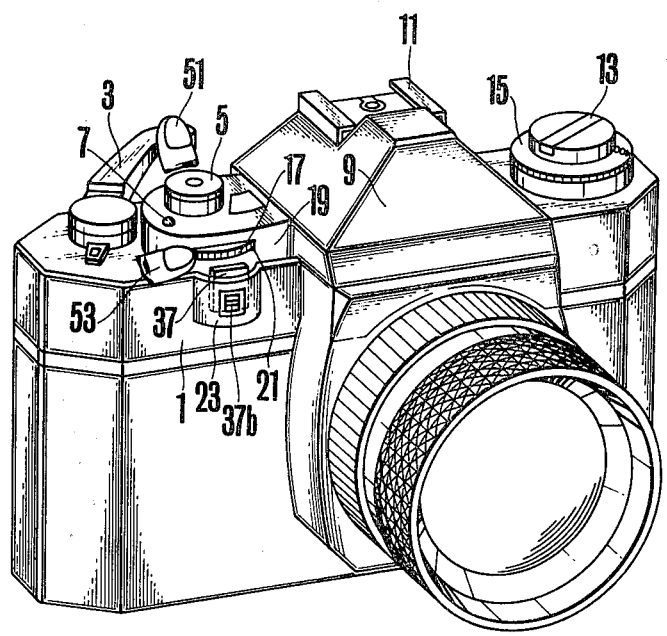
FIG. 1 is a perspective view of a single lens reflex camera provided with a safety device in one form of the present invention.

Referring to FIG. 1, there is shown a camera equipped with diaphragm preselection and shutter preselection automatic exposure ranges. Positioned on the top panel of a camera housing 1 are a film winding lever 3, a shutter button 5, and a display lamp 7 for indicating the operation of a self-timer, these parts being located on the right-hand side of a pentaprism housing 9 with an accessory shoe 11 thereon. A rewind knob 13 and a film speed dial 15 concentric to the knob 13 are also provided on the left-hand corner of the top panel.

Figure 2:
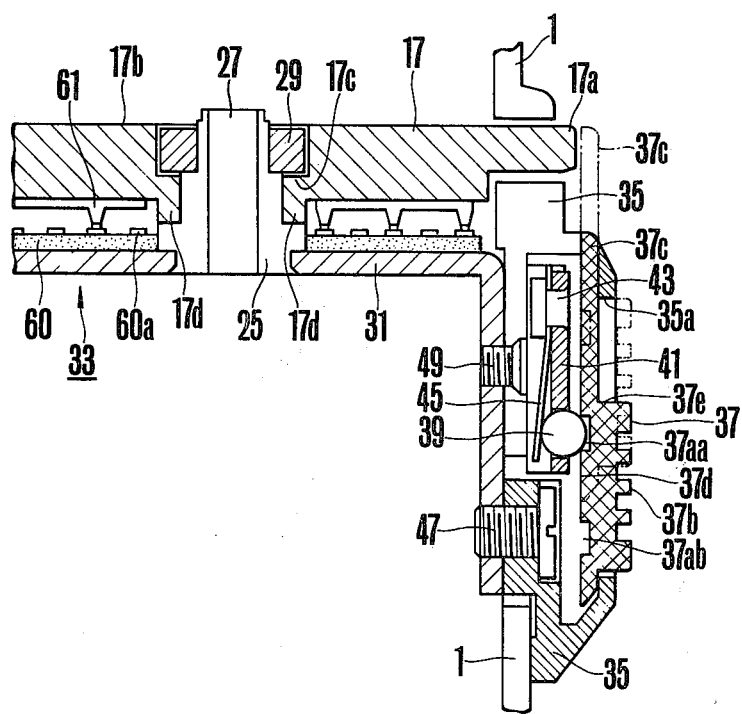
FIG. 2 is a longitudinal vertical sectional view of the safety device showing a fragment of the camera housing of FIG. 1.

Referring also to FIG. 2, there is provided a dial 17 for selectively setting either one of two exposure factors of diaphragm value and shutter speed. The dial 17 is rotatably mounted on a bushing 25 in which a shaft 27 is located. A nut 29 is threaded into the bushing 25 to constrain the dial 17 at the upper surface 17c of a flange of the dial 17, while the lower surface 17d abuts against a flange of the bushing 25, so that the dial 17 is retained from upward movement when it is rotated about the shaft assembly 25, 27 which is mounted on a support plate 31. Such exposure factor setting mechanism is housed within the inside of a deck 19 (FIG. 1) whose front face is in the same plane as the front panel of the camera housing. The dial 17 radially extends in part through and outwardly beyond a slot 21 in the front wall of the deck 19 so that the dial 17 is accessible at a knurled periphery 17a whereby the operator may set a desired value of a diaphragm aperture or shutter speed on the respective scales 17b on the upper surface of the dial 17.

A safety device of the invention comprises an access inhibiting member which operates to cover and uncover the dial 17. The access inhibiting member comprises a laterally curved slide plate 37 configured to generally conform to the periphery of the dial 17, with the plate 37 being movably mounted in a casing 35 fixedly secured to a rectangularly bent-off portion of a dial support plate 31 through a fitted hole in the front panel of the camera housing 1 by fasteners 47 and 49. A click stop mechanism is structured to comprise a steel ball 39 freely fitted in a hole of a plate 41 which is fixedly secured to the casing 35, and a snap spring 45 connected at one end to the plate 41 by a fastener 43 and acting at the other end on the steel ball 39. When the slide 37 is set in a retracted position shown in solid lines in FIG. 2, the ball 39 enters a recessed portion 37aa in the back surface of the slide 37 to prevent accidental upward movement of the slide 37.

With the safety device in the retracted position, the operator is able to turn the dial 17 along with a number of brushes 61 arranged on the lower surface thereof to slidingly move on respective tracks of electrically conductive patterns 60a on an insulating substrate 60 to convert the set value of the exposure factor into a corresponding electrical signal. During film winding and shutter cocking operation, however, the operator is very likely to concentrate his attention on the thumb 51 of the right hand for engaging therewith the lever 3. Therefore, he is likely to place his middle or index finger 53 on the knurled periphery of the dial 17 while being unconscious of the fact that this finger is thus positioned. If so, inadvertent actuation of the dial 17 may occur, causing the next exposure to be effected with a shutter speed or diaphragm value different from that in the preceding exposure.

To prevent such inadvertent actuation of the dial 17, after a desired value of exposure factor has been set, the operator will move the slide 37 upward until the upper edge 37e of a knurled key portion 37b strikes the upper end of a slot 35a in the casing 35, whereby a cover portion 37c of the slide 37 is brought into radial alignment with the dial 17 to prevent the operator from inadvertently actuating the dial 17. This position of the slide 37 is shown in dotted lines in FIG. 2. During this upward movement of the slide 37, the ball 39 is first pushed to the left against the force of snap spring 45 as it rides on a surface 37b on the interior of the slide 37. The ball 39 then rolls on the surface 37d while being constrained within the hole in the plate 41 as the slide 37 moves upwardly. The ball 39 then enters a second recess 37ab so that the slide 37 is restrained against the accidental downward movement from the covering position. With the safety device in this position, the operator may make a number of successive exposures with the same exposure setting without the risk that the exposure setting will be accidentally changed during the film winding and shutter cocking operation between the exposures. If the operator desires to alter the value, he need only move the slide downwardly by pressing on the knurled key portion 37b.

While a specific embodiment of the invention has been shown and described in detail to illustrate the application of the inventive principles, it will be understood that the invention may be embodied otherwise without departing from such principles.

What is claimed is:

1. In a camera including a casing having an upper side and a front side, film winding means mounted on said upper side of said casing and being manually horizontally movable, and a dial manually operable to effect setting of exposure values for said camera, said dial being mounted on said upper side of said casing and including a manually engageable surface extending toward the front side thereof and generally parallel thereto, the improvement of a safety device comprising a cover member mounted on said casing on said front side thereof and extending generally parallel therewith, means mounting said cover on said camera for movement vertically between an upper position wherein said cover member extends over said dial to block manual access to said dial, and a lower position permitting access to said dial, first means located within said camera engaging said cover member to hold said cover member at each of said upper and lower positions, and means formed on a side of said cover facing toward said front side of said casing and exposed on the exterior of said camera for facilitating manual gripping of said cover member to enable said cover member to be moved to said upper and to said lower positions.

2. A camera according to claim 1, wherein said first means comprise a ball, means defining an orifice having said ball mounted therein restraining movement of said ball vertically but allowing said ball to move horizontally, said ball being arranged to abut the inside of said cover member on one side of said orifice, and a leaf spring mounted on the other side of said orifice spring biasing said ball against said cover member, said cover member having an upper and a lower recess formed on the inside thereof adapted to have said ball engaged therein to hold said cover member in said upper and lower positions, respectively.

3. In a camera including a casing having an upper side and a front side, film winding means, and a dial manually operable to effect setting of exposure values for said camera, said dial being mounted on said upper side of said casing and including a manually engageable surface extending toward the front side thereof and generally parallel thereto, the improvement of a safety device comprising: a cover member mounted on said front side of said casing within the moving range of an operator's finger during the operation of said film winding means, said cover member extending generally parallel with said front side; means mounting said cover member on said camera for movement vertically between an upper position wherein said cover member extends over said dial to block manual access to said dial, and a lower position permitting access to said dial; first means located within said camera engaging said cover member to hold said cover member at each of said upper and lower positions; and means formed on a side of said cover member facing toward said front side of said casing and exposed on the exterior of said camera for facilitating manual gripping of said cover member to enable said cover member to be moved to said upper and to said lower positions.

4. In a camera including a casing having an upper side and a front side, film winding means, and a dial manually operable to effect setting of exposure values for said camera, said dial being mounted on said upper side of said casing and including a manually engageable surface extending toward the front side thereof and generally parallel thereto, the improvement of a safety device comprising: a cover member mounted on said front side of said casing within the range of movement of an operator's finger during the operation of said film winding means, said cover member extending generally parallel with said front side; means mounting said cover member on said camera for movement vertically between an upper position wherein said cover member extends over said dial to block manual access to said dial, and a lower position permitting access to said dial; spring biased means located within said camera engaging said cover member to hold said cover member at each of said upper and lower positions; and means formed on a side of said cover member facing toward said front side of said casing and exposed on the exterior of said camera for facilitating manual gripping of said cover member to enable said cover member to be moved to said upper and to said lower positions.

5. A camera according to claim 4, wherein said spring biased means comprise a ball, means defining an orifice having said ball mounted therein restraining movement of said ball vertically but allowing said ball to move horizontally, said ball being arranged to abut the inside of said cover member on one side of said orifice, and a leaf spring mounted on the other side of said orifice spring biasing said ball against said cover member, said cover member having an upper and a lower recess formed on the inside thereof adapted to have said ball engaged therein to hold said cover member in said upper and lower positions, respectively.

* * * * *